L. H. WHITNEY.
Training Hop Vines.
No. 2,752. Reissued Aug. 20, 1867.
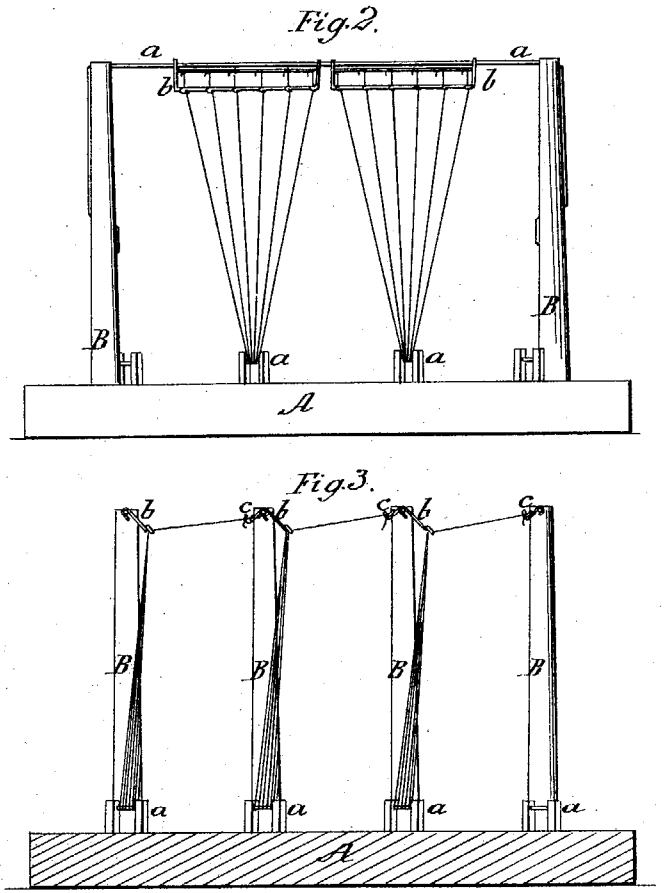
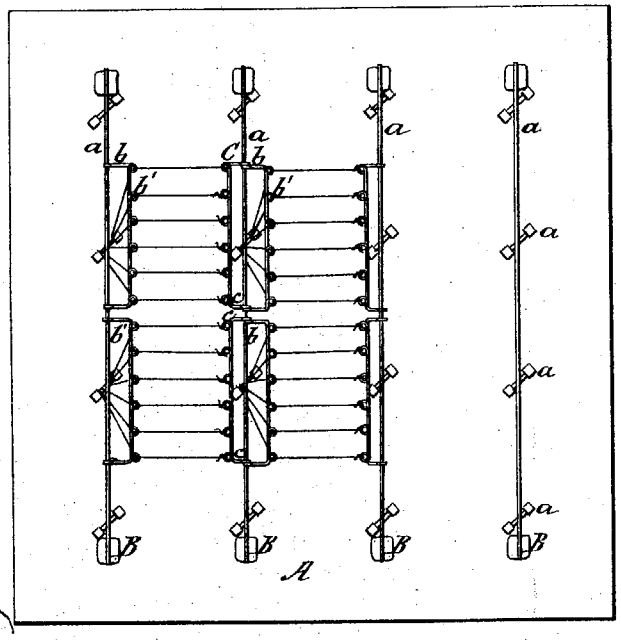
Witnesses.
Alex Molson
Alex Stout Jr.
Inventor
Lew H. Whitney
N. PETERS, PHOTO-LITHOGRAPHER, WASHINGTON, D. C.

UNITED STATES PATENT OFFICE.

LEVI H. WHITNEY, OF VALLEJO, CALIFORNIA.

IMPROVEMENT IN MODES OF TRAINING HOPS, &c.

Specification forming part of Letters Patent No. 60,306, dated December 4, 1866; Reissue No. 2,752, dated August 20, 1867.

*To all whom it may concern:*

Be it known that I, LEVI H. WHITNEY, of Vallejo, in the county of Solano and State of California, have invented a new and useful Improved Mode of Training Hop-Vines, Grape, and Beans; and I do hereby declare the following to be a full, clear, and exact description of the same, reference being had to the accompanying drawings.

My invention relates to an improved mode of training hop-vines, &c.; and it consists, first, in training the vines of each hill up separate and diverging wires until they reach an elevation of seven feet, or thereabout, when they are trained upon horizontal wires stretching across the field, and so disposed as to afford each vine its proportion of space, sunlight, and air; second, in the device for supporting the cords or strings around which the vines twine and climb to the top of the trellis, and keeping each string or cord in its appropriate place, and in training the vines in one direction after they have reached the top; third, in the manner of constructing and arranging the yoke or wicket, to which the cords are secured, immediately over the root of the vine, so as to prevent the least obstacle to the necessary culture of the vine during growth.

The object of my invention is—

First. To train hop-vines, &c., so that each bearing-vine may be exposed to the influence of the sunlight and air equally with every other vine. This can never be the case when the vines from each hill are compelled to climb a single pole or run upon a single cord. The stronger vine will then invariably overpower the weaker, and while the yield in fruit of the former will not be increased, the productive power of the latter will be materially reduced. By my mode of training the weaker vines are not compelled to contend with the stronger, but being separated from them, they are permitted to attain the utmost development possible to them, and their yield will therefore be increased.

Second. To train the vines in such a manner as to render them accessible for the purpose of gathering the fruit without cutting the vines themselves. This is accomplished by training the vines horizontally at a convenient distance from the ground. The fruit will then be found dependent mostly from the horizontal stems, and may be readily gathered without admixture with leaves from the vine, which of itself is an important desideratum in the cultivation of hops.

Third. To avoid the necessity of cutting the green vines at the root, because thus cutting them permits a great loss in the sap of valuable constituents from the soil.

Fourth. To avoid or reduce the expense of furnishing a field with poles.

Fifth. To reduce the expense and labor of handling and disposing of the refuse of the crop, &c.

The following description will set forth devices which I have adopted to carry my invention into effect, though I do not wish to be understood as limiting myself to their precise details of construction or arrangement, but only to such construction as will carry out the spirit of my invention in uniform and separate training of the vines.

Figure 1 is a bird's-eye view of a section of hop-field with my device erected thereon. Fig. 2 is a side view, showing the arrangements of the cords and the devices for holding them in place. Fig. 3 is an end view of the same.

In all the figures, A represents the surface of the ground, in which are firmly placed the posts B B B, &c., with the transverse bars or rods *a a a* thereon, ranged east and west, but otherwise arranged and constructed in the manner usual for such purposes. The shackles *b b b*, through which pass loosely the strings, cords, or wires upon which the vines twine and climb, are made of pieces of strong wire, supported, if necessary, at regular intervals, and formed into one or more loops, as shown at *b'*; or the same result may be obtained by using a rod of either wood or iron, notched at proper intervals for the reception and passage of the cord, and swinging by arms of stout wire from the supporting-rods. The arms of these shackles are longer to allow the loops to drop lower than those of the opposite shackles, *c c*, to which the ends of the cords are secured for the purpose of leading the vines up to and over the supporting-rod onto the other or adjoining section of trellis, as shown in Fig. 3, the growth being in the direction from left to right in Figs. 1 and 3, and in practice from north to south, across the field. The yokes or wickets *d d d*, to which the lower ends of the cords are secured, are placed across each hill of vines in a direction diagonal to the supporting wires or rods, as shown in Figs 1 and 3, so as to prevent as little obstacle to the tillage of the crop as possible. They are constructed by driving short posts firmly into the ground, and then passing transversely through holes near the top a rod of wood or iron, to which the lower ends of the cords are attached.

The shackles may be made of any convenient length, and to support any desirable number of cords, and are allowed to swing freely upon the supporting-wire, and to assume any angle required by the tension of the cords which pass through the loops or are secured thereto. The twine or cord used is first prepared by saturating it in whale-oil, after which it is treated in the same manner with benzine, to protect the twine against the action of the weather and the hop-vines from the depredations of insects.

Having thus described my invention, what I claim as new is—

1. The herein-described mode of training hop-vines, grape-vines, &c., in such a manner as to lead them up wires diverging from each hill, and then horizontally across the space to the next row opposite upon wires retained separate at any desirable width or distance from each other over the whole surface of the plantation, substantially as set forth.

2. The shackles or device herein described for securing the string or cords, when constructed and used in the manner described.

3. Constructing the shackles *b b b* with longer arms than those of *c c c*, to allow them to drop lower than the latter, to which the upper ends of the cords are attached.

4. The device constructed and arranged, as described, for securing the lower ends of the cords over the hills of vines, for the purpose described.

LEVI H. WHITNEY.

Witnesses:
R. D. O. SMITH,
D. B. VENTRE.